(12) United States Patent
Huang et al.

(10) Patent No.: US 8,803,943 B2
(45) Date of Patent: Aug. 12, 2014

(54) FORMATION APPARATUS USING DIGITAL IMAGE CORRELATION

(75) Inventors: Chi-Hung Huang, Hsinchu (TW);
Yung-Hsiang Chen, Hsinchu (TW);
Wei-Chung Wang, Hsinchu (TW);
Tai-Shan Liao, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 580 days.

(21) Appl. No.: 13/238,142

(22) Filed: Sep. 21, 2011

(65) Prior Publication Data
US 2013/0070048 A1  Mar. 21, 2013

(51) Int. Cl.
*H04N 13/02* (2006.01)
*G06T 7/00* (2006.01)
*G01B 11/16* (2006.01)
*H04N 17/00* (2006.01)

(52) U.S. Cl.
CPC ....... *G01B 11/16* (2013.01); *G06T 2207/10012* (2013.01); *G06T 7/002* (2013.01); *G01B 2210/52* (2013.01); *H04N 13/0246* (2013.01); *H04N 13/0242* (2013.01)
USPC .............................................. 348/36; 348/47

(58) Field of Classification Search
USPC ......................................................... 348/36
See application file for complete search history.

(56) References Cited

U.S. PATENT DOCUMENTS

| | | | |
|---|---|---|---|
| 8,248,476 B2 * | 8/2012 | Ke et al. | 348/187 |
| 8,600,147 B2 * | 12/2013 | Iliopoulos et al. | 382/141 |
| 2011/0310229 A1 * | 12/2011 | Ueda | 348/46 |
| 2012/0032946 A1 * | 2/2012 | Wang et al. | 345/419 |
| 2012/0287248 A1 * | 11/2012 | Erdman, III et al. | 348/47 |
| 2013/0044186 A1 * | 2/2013 | Jin et al. | 348/46 |
| 2013/0063570 A1 * | 3/2013 | Michopoulos et al. | 348/47 |
| 2013/0070048 A1 * | 3/2013 | Huang et al. | 348/36 |
| 2014/0104387 A1 * | 4/2014 | Klusza et al. | 348/46 |

* cited by examiner

*Primary Examiner* — Sath V Perungavoor
*Assistant Examiner* — Howard D Brown, Jr.
(74) *Attorney, Agent, or Firm* — Jackson IPG PLLC

(57) ABSTRACT

The present disclosure uses at least three cameras to monitor even a large-scale area. Displacement and strain are measured in a fast, convenient and effective way. The present disclosure has advantages on whole field, far distance and convenience.

28 Claims, 9 Drawing Sheets

FORMATION APPARATUS USING DIGITAL IMAGE CORRELATION

TECHNICAL FIELD OF THE DISCLOSURE

The present disclosure relates to digital image correlation; more particularly, relates to monitoring even a large-scale area with at least three cameras for measuring displacement and strain.

DESCRIPTION OF THE RELATED ART

Digital image correlation was revealed in 1980s. In 1982, Peters and Ranson studied reaction of object after affected by outer force through digital images (Peters, W. H., and Ranson, W. F., 1982, "Digital image techniques on experimental stress analysis" Opt. Eng., 21(3), 427-431). They, then, worked with other people on studying image preprocessing, value convergence and evaluation (Sutton, M. A., Wolters, W. J., et al., 1983, "Determination of displacements using an improved digital image correlation method," Image Vision Computing, 1(3), 133-139; Chu, T. C., Peters, W. H., Sutton, M. A., McNeil, S. R., 1985, "Application of digital image correlation to experimental mechanics," Image Vision Computing, 25(3), 232-245; and, Sutton, M. A., McNeil, S. R., et al., 1988, "Effect of subpixels image restoration on digital correlation error estimates," Opt. Eng., 27(10), 870-877.) Sequential studies included interpolation of digital image value and affection of the subimage's size on convergence time and accuracy.

Related digital image applications were sprung out after related basics were revealed. Sutton, et al. revealed an application in 3D deformation deformation (Sutton, M. A., Peters, W. H., Chao, Y. J., Luo, P. F., 1993, "Accurate measurement of three-dimensional Deformations in deformable and rigid bodies using computer vision," Experimental Mechanics, 33(2), 123-132.) Then, 3D observation concept were applied in surface profile measurement (Sutton, M. A., McNeil, S. R., et al., 1997, "Measurement of surface profile using digital image correlation," Experimental Mechanics, 37(1), 13-20.) Except Sutton, Oulamara and James, et al. used digital images to build field measurement systems for deformation and strain (Oulamara, A., Tribillon, G., Dunvernoy, J., 1988, "Subpixel speckle displacement using a digital processing technique," Journal of Modern Optics, 37, 1201-1211; and, James, M. R., Morris, W. L., Cox, B. N., 1990, "A high accuracy automated strain-field mapper," Experimental Mechanics, 30(1), 60-67.) Septanika revealed a measurement system for big strain ratio (Septanika, E. G., Ernst, L. J., van den Hoof, L. A. C. M., 1998, "An automatic and interactive large-deformation measurement system based on image processing," Experimental Mechanics, 38(3), 181-188.)

In the present market, a product using basic non-contact image deformation measuring device is VIC 3D, Correlated Solutions. In FIG. 9, a tenon 60 is combined with two cameras 61,62 to form a three-dimensional (3D) measuring device for measuring whole field deformation on object's surface. The device uses characteristics of object's surface for comparing and diagnosing surface displacement. Image taking process by the cameras 61,62 and the image correlation are combined to finish measuring 3D surface deformation in the fastest way and to obtain the best resolution. Any tiny surface deformation can be shown in data and on the image. Then, through post-processing, displacement and strain of any single dot on surface can also be figured out.

However, the device can not monitor an outdoor scene, like mountain tendency. Although the traditional strain meter can measure strain with high accuracy, the strain meter is hard to be applied on multiple points or whole field, which may become expensive and cause problems in line layout. In addition, displacement has to be monitored, too. It is because displacement reaction of a structure is closely related to material characteristics and rigidity. A big displacement may harm rigidity of the structure. Position and level of damages can be detected to evaluate safeties on rigidity and bearing capacity of the structure for later maintaining, bracing or even reconstructing.

The prior art in FIG. 9 uses two cameras for measurement for 3D deformation. But, when the monitored area is larger than the combined visual areas of the two cameras, only partial area is monitored and shielded area is excluded. Not to mention that different objects need adjusting postures of the cameras for different calibration. Hence, the prior art does not fulfill all users' requests on actual use.

SUMMARY OF THE DISCLOSURE

The main purpose of the present disclosure is to monitor even a large-scale area with at least three cameras for measuring displacement and strain in advantages of whole field, far distance and convenience.

To achieve the above purpose, the present disclosure is a formation apparatus using digital image correlation, comprising a bearing unit, a plurality of adjusting units, an image taking unit, a calibration plate and a processing unit, where the bearing unit comprises a base and a measuring track; the measuring track is bonded with the base; the adjusting units comprises at least a first adjusting unit, a second adjusting unit and a third adjusting unit; the adjusting units are movably set on the measuring track; the image taking unit comprises at least a first camera, a second camera and a third camera; the first, the second and the third cameras are set on at least the first the second and the third adjusting units, respectively; at least the first, the second and the third cameras use at least a first calibrating point and a second calibrating point as reference points for measurement; the calibration plate is set on a plane of optical axes of at least the first, the second and the third cameras; the processing unit is connected with at least the first, the second and the third cameras; and the processing unit has a digital image formation computing module to analyze digital image data obtained from at least the first, the second and the third cameras. Accordingly, a novel formation apparatus using digital image correlation is obtained.

BRIEF DESCRIPTIONS OF THE DRAWINGS

The present disclosure will be better understood from the following detailed description of the preferred embodiment according to the present disclosure, taken in conjunction with the accompanying drawings, in which FIG. 1 is the perspective view showing the preferred embodiment according to the present disclosure;

DESCRIPTION OF THE PREFERRED EMBODIMENT

Figure 1:
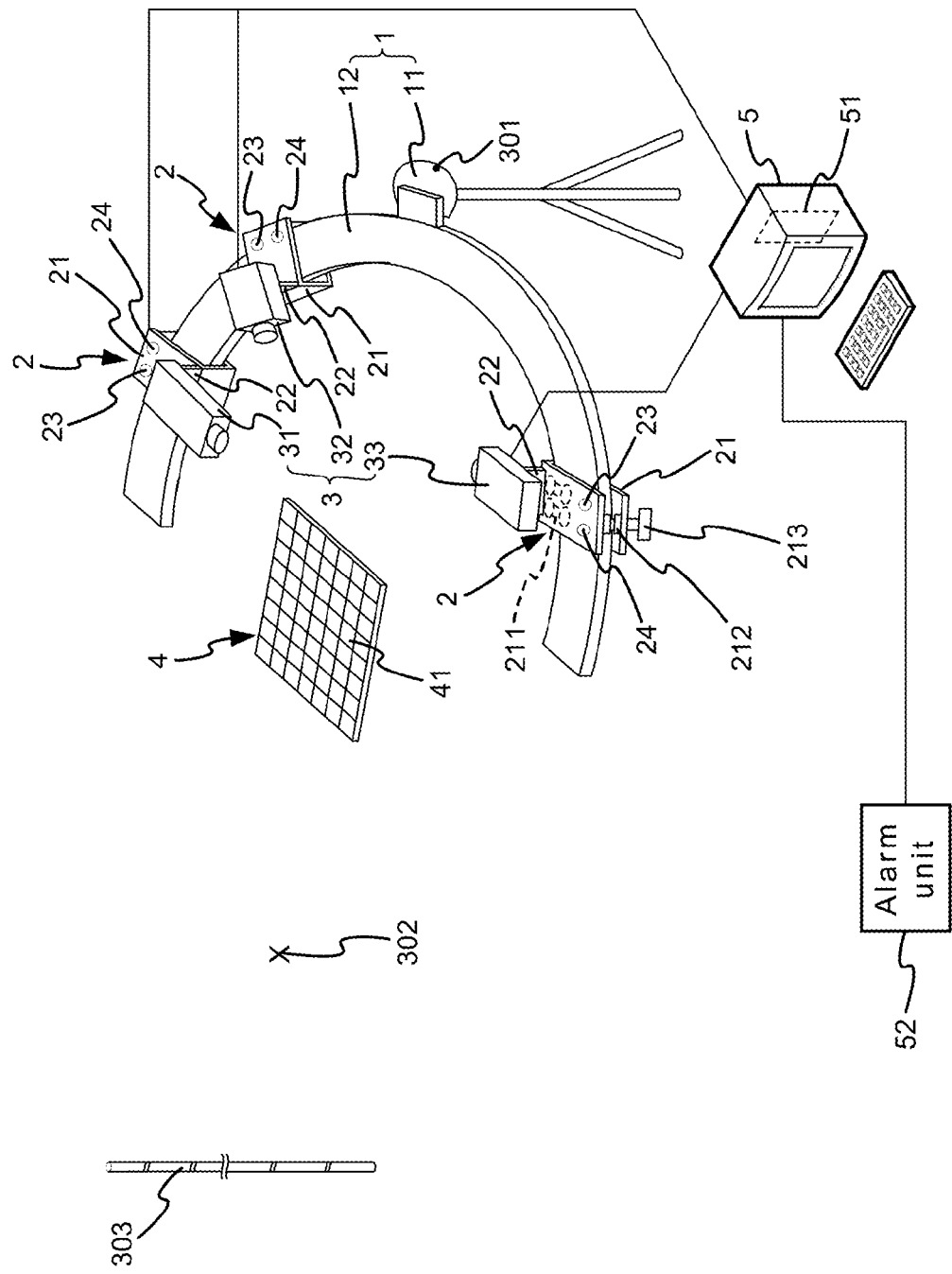
Figure 2:
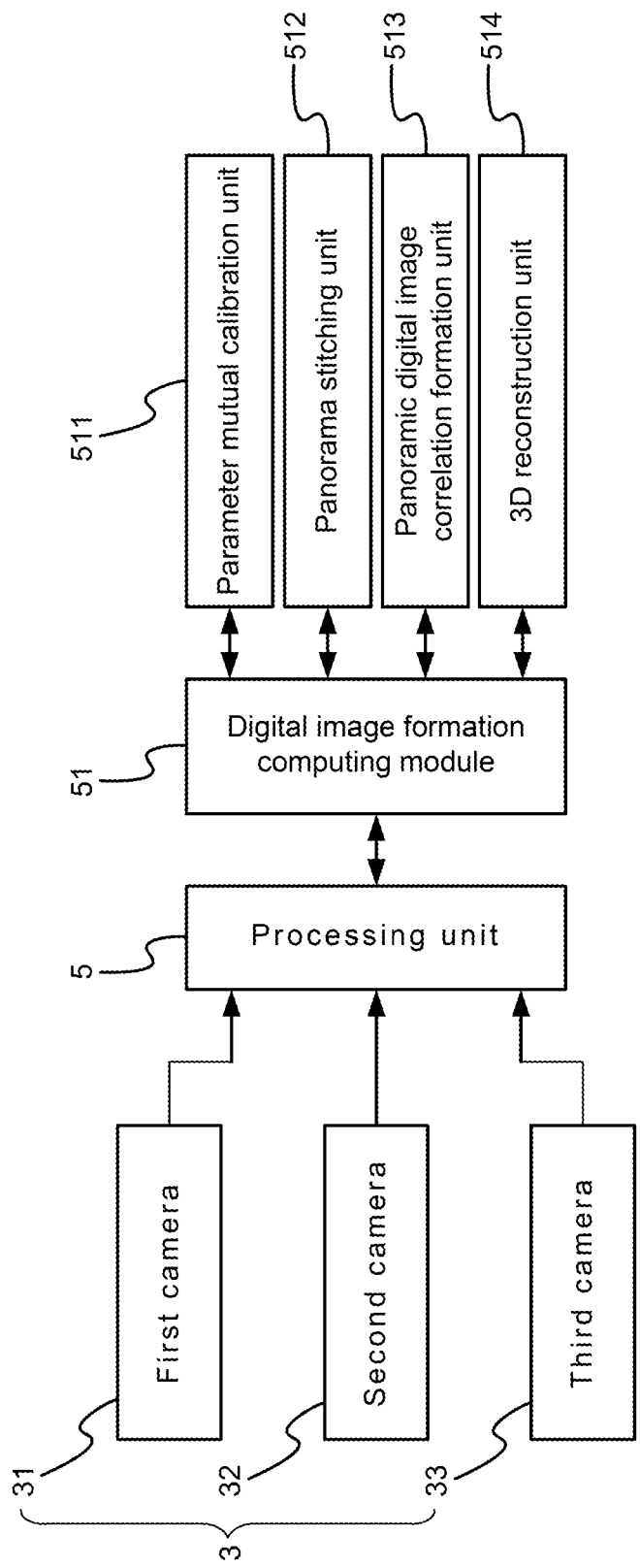
FIG. 2 is the view showing the image taking unit and the processing unit.

The following description of the preferred embodiment is provided to understand the features and the structures of the present disclosure.

Please refer to FIG. 1 to FIG. 8, which are a perspective view showing a preferred embodiment according to the present disclosure; a view showing an image taking unit and a processing unit; a view showing a 3D strain measuring system; a first view showing a measurement of camera calibration parameters; a view showing a camera model and a projecting process; a view showing a calibrating point on a Π' plane; a second view showing the measurement of camera calibration parameters; and a view showing a panorama stitching. As shown in the figures, the present disclosure is a formation apparatus using digital image correlation, comprising a bearing unit 1, a plurality of adjusting units 2, an image taking unit 3, a calibration plate 4 and a processing unit 5.

The bearing unit 1 comprises a base 11 and a measuring track 12, where the measuring track 12 is bonded with the base 11 and has a hollow arc shape.

The adjusting units 2 are movably set on the measuring track 12, where each adjusting unit 2 comprises a slider 21 movably bonded with the measuring track 12; an adjusting seat 22 set on the slider 21; a balancing unit 23 set on the slider 21; and an electric controller 24 set on the slider 21. Therein, the slider 21 has a pulley 211 and a tensioner 212 at two ends to be butted against the measuring track 12; the tensioner 212 is connected with an adjusting knob 213; the slider 21 moves on the measuring track 12 with the pulley 211 and the tensioner 212 and is positioned by the adjusting knob 213 coordinated with the tensioner 212; and, the balancing unit 23 and the electric controller 24 are used to adjust fixation angles of cameras to be concyclic with the cameras carried by the adjusting units 2 to make optical axes of the cameras crossing at a cyclic center.

The image taking unit 3 comprises at least a first camera 31, a second camera 32 and a third camera 33 separately set on the adjusting seats 22 of the adjusting units 2, where at least the first, the second and the third cameras 31,32,33 uses at least a first calibrating point 301 and a second calibrating point 302 as reference points for measurement. Since the measuring track 12 has a hollow arc shape, the optical axes 311,321,331 of at least the first, the second and the third cameras 31,32,33 are concyclic with a cyclic center. At least the first, the second and the third cameras 31,32,33 use the adjusting units 2 to adjust intervals in between. Therein, the first calibrating point 301 is set on the base 11 to fix at least the first, the second and the third cameras 31,32,33 so that at least the central optical axes 311,321,331 of the first, the second and the third cameras 31,32,33 are crossed at the cyclic point used as an initial point for measurement. The second calibrating point 302 is a reference point in an outdoor scene and is located on the same optical axis for the central optical axis 321 of the second camera 32 and an axis of the first calibrating point 301, where the second calibrating point 302 is thus used for initializing measurement. The second calibrating point 302 is coordinated with a labeling rod 303 located at a place close to the to-be-photographed object for repeated uses by at least the first, the second and the third cameras 31,32,33, where the labeling rod 303 has a labeling scale for processing calibration.

The calibration plate 4 is set on a plane of the optical axes of at least the first, the second and the third cameras 31,32,33; and has a calibration grid center to be used as a calibrating point for at least the first, the second and said third cameras 31,32,33 to process calibration. Every one of the calibration grids 41 of the calibration plate 4 is circular or square. When the calibration grids 41 of the calibration plate 4 are not parallel to the image plane of at least the first, the second and the third cameras 31,32,33, images obtained by at least the first, the second and the third cameras 31,32,33 will be twisted.

The processing unit 5, comprising a digital image formation computing module 51, is connected with the first, the second and said third cameras 31,32,33 to analyze digital image data obtained from at least the first, the second and the third cameras 31,32,33. The processing unit 5 is further connected with an alarm unit 52. The digital image formation computing module 51 comprises a parameter mutual calibration unit 511, a panorama stitching unit 512, a panoramic digital image correlation formation unit 513 and a three-dimensional (3D) reconstruction unit 514, where the first, the second and the third cameras 31,32,33 are coordinated with the calibration plate 4 to process calibration; and the digital image formation computing module 51 analyzes image data obtained through the first, the second and the third cameras 31,32,33 to figure out values of displacement and strain.

Thus, a novel formation apparatus using digital image correlation is obtained.

On using the present disclosure in an outdoor scene, a 3D deformation can be detected. The bearing unit 1; the three adjusting units 2; the first, the second and the third cameras 31,32,33 of the image taking unit 3; and the calibration plate 4 are set in the outdoor scene. The digital image formation computing module 51 of the processing unit 5 regards the outdoor scene as an object to be photographed to process an automatic machine visual detection for calculating related coefficients of continuous images and deformation (displacement). The processing unit 5 controls the first, the second and the third cameras 31,32,33; and auxiliary monitoring with human eye is also processed, where real-time images are transmitted through network distribution for a large-scale real-time stress testing; where high-voltage power towers, mountain tendencies, buildings, base structures and distributions of rocks are continuously monitored; and where the alarm unit 52 will send out alarms once deformation and/or displacement of the outdoor scene reaches critical thresholds.

Figure 3:
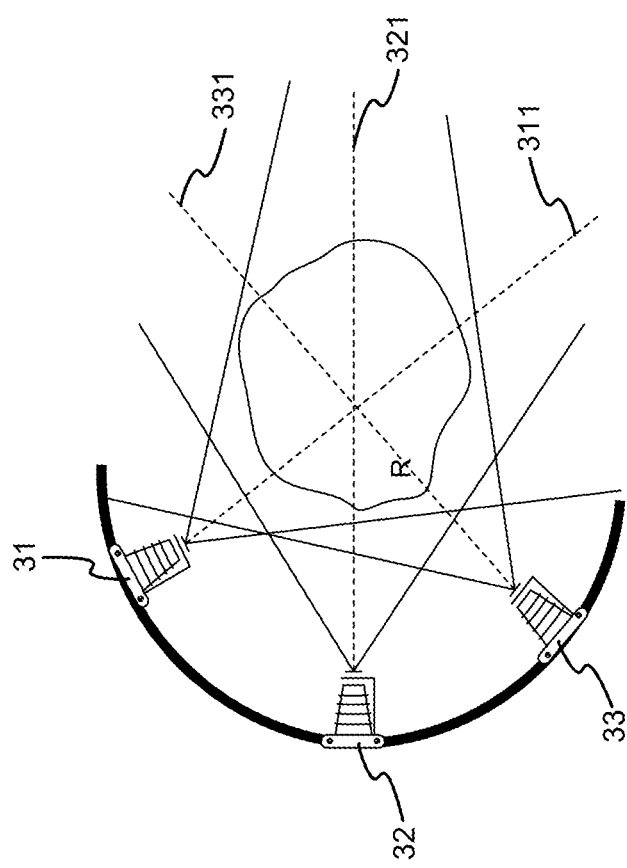
FIG. 3 is the view showing the 3D strain measuring system.

For enhancing processing velocity, original image data amount is simplified. Samples of partial characteristics are taken to greatly reduce calculating time. The present disclosure is used to identify characteristic curves of outdoor scene to monitor relative displacement between objects, where the characteristics are relative linkages between high-voltage power towers, mountain tendencies, base structures, and distributions of rocks. In FIG. 3, boundaries of high-voltage power towers, mountain tendencies, base structures, and distributions of rocks are used to replace characteristic curves of outdoor scene; and the characteristic curves are automatically obtained through boundary searching theory. The characteristic curves comprises reserved positions in digital image array; and the data on the characteristic curves are summarized into an array of simplified data I(t). The characteristic curves array of I(t) is processed through cross-correlation to obtain cross-correlation coefficients between the real-time characteristic curves array and the original characteristics array. The cross-correlation coefficients can be regarded as critical factors for the outdoor scene, whose values are highly negatively related to a dangerous degree of the outdoor scene.

In FIG. 3, the first, the second and the third cameras 31,32, 33 of the image taking unit 3 have photographed an outdoor image area R with the central optical axes 311,321,331 of the first, the second and the third cameras 31,32,33 for obtaining digital image data. Then, the digital image formation computing module 51 of the processing unit 5 processes an analysis to figure out values of displacement and strain of the outdoor image area R for processing digital image formation by the parameter mutual calibration unit 511, the panorama stitching unit 512, the panoramic digital image correlation formation unit 513 and the 3D reconstruction unit 514.

The central optical axis 311 of the first cameras 31, the central optical axis 321 of the second cameras 32 and the central optical axis 331 of the third cameras 33 are perpendicular to calibration specimens for figuring out three sets of inner and outer parameters for a set of the second camera 32 and the third camera 33; a set of the first camera 31 and the third camera 33; and a set of the first camera 31 and the second camera 32, for 3D strain measurement, respectively. For a panorama image, the set of the second camera 32 and the third camera 33; the set of the first camera 31 and the third camera 33; and the set of the first camera 31 and the second camera 32 are used to figure out three sets of panorama strain measurement data.

Figure 4:
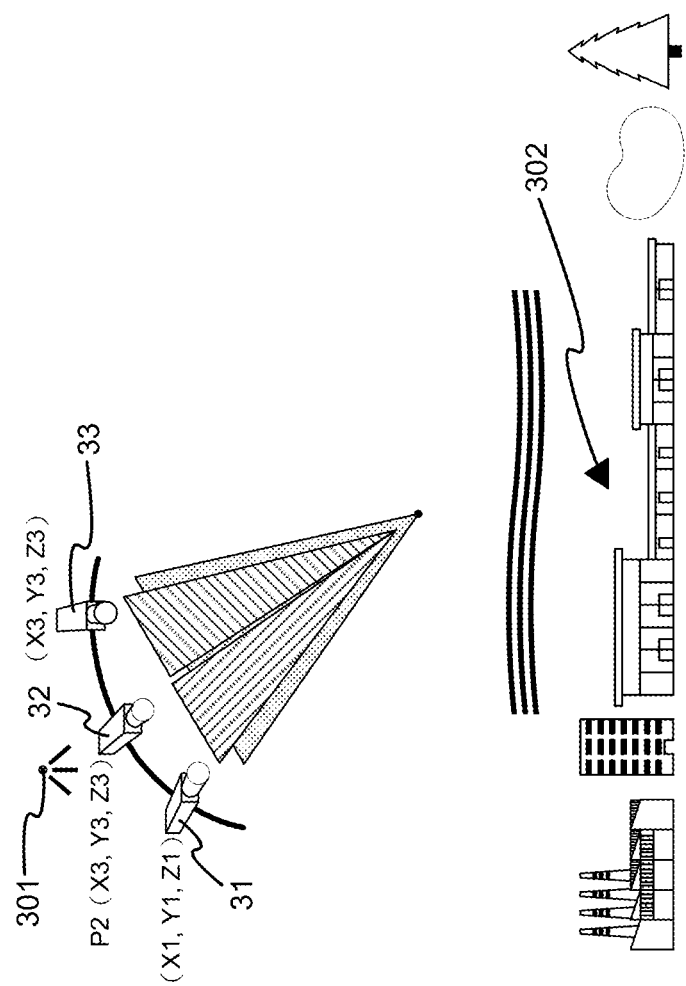
FIG. 4 is the first view showing the measurement of camera calibration parameters.

In FIG. 4, the optical axes 311,321,331 of the first, the second and the third cameras 31,32,33 are concyclic with a cyclic center; and a center of the calibration grids 41 having a fixed interval between every two grids is used as a calibrating point for calibration for the first, the second and the third cameras 31,32,33. For overcoming rugged ground of the outdoor scene and improving accuracy of repeating measurements, the first and the second calibrating points 301,302 are set as reference points for measurement for the first, the second and the third cameras 31,32,33. The first calibrating point 301 is used to fix the central optical axes 311,321,331 of the first, the second and the third cameras 31,32,33 to be crossed at the cyclic center; the cyclic center is used as an initial point (0,0,0) for measurement; and, the second calibrating point 302 is used as a reference point (0,0,0) for the outdoor scene. D is a reference distance from the outdoor scene to the first, the second and the third cameras 31,32,33. In addition, the first calibrating point 301; a center point (P2) of the second camera 32; and the second calibrating point 302 are on an optical axis line for initializing measurement.

Each of the first, the second and the third cameras 31,32,33 comprises a lens and an image plane. The image plane is located before the center of the lens C; and a distance of a focal length is obtained between the image plane and the center of the lens. A point P(x,y,z) on an object (i.e. the outdoor scene) is projected to the image plane as another point Pc(uc,vc) which is an intersected point on the image plane for a connecting line of C point and P point. According to a formula of similar triangles relationship, relationship between coordinates (x,y,z) of a camera and coordinates $(u_0, v_0)$ on the image plane is as follows:

$$\left\{ \begin{array}{c} Zu_c \\ zv_c \\ z \end{array} \right\} = \begin{bmatrix} f & 0 & u_0 & 0 \\ 0 & f & v_0 & 0 \\ 0 & 0 & 1 & 0 \end{bmatrix} \begin{Bmatrix} x \\ y \\ z \\ 1 \end{Bmatrix} = P \begin{bmatrix} x \\ y \\ z \\ 1 \end{bmatrix}. \quad (7)$$

Therein, $(u_0, v_0)$ are coordinates of a center point of the image plane.

Figure 5:
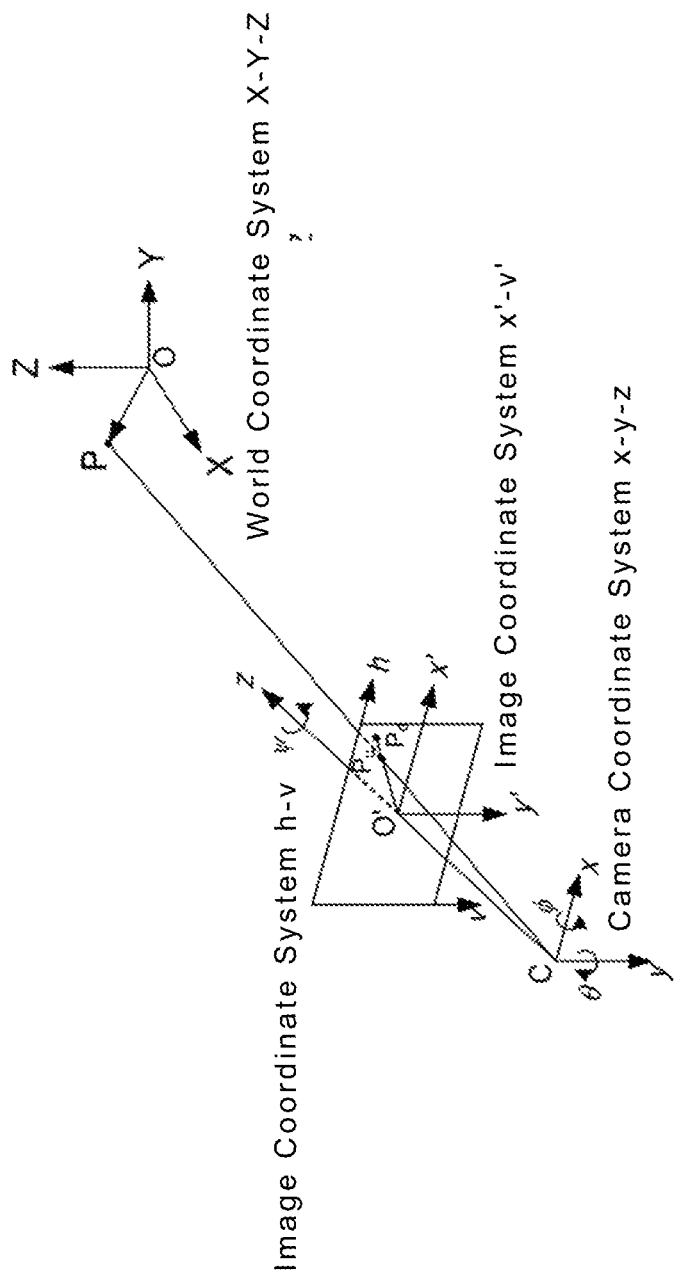
FIG. 5 is the view showing the camera model and the projecting process.

In FIG. 5, O and O' are an origin point of world coordinate system X-Y-Z and an origin point of image coordinate system u-v, respectively; and, C is a center point of lens of a camera, which is also an origin point of a camera coordinate system x-y-z of the first, the second or the third cameras 31,32,33. The u axis and the v axis of the image coordinate system are parallel to the x axis and the y axis of the camera coordinate system, where the origin point of the image coordinate system is located at the upper left corner.

For a point P in the space, through a rotation matrix R and a translation matrix t, a conversion relationship between a point PW(X,Y,Z) in the world coordinate system and a point Pca(x,y,z) in the camera coordinate system is built:

$$\begin{bmatrix} x \\ y \\ z \\ 1 \end{bmatrix} = \begin{bmatrix} R & t \\ 0 & 1 \end{bmatrix} \begin{bmatrix} x \\ y \\ z \\ 1 \end{bmatrix} = M \begin{bmatrix} x \\ y \\ z \\ 1 \end{bmatrix}. \quad (8)$$

Therein, $R = R(\theta, \phi, \Phi)$ and is a 3×3 rotation matrix defined by $\theta$, $\phi$ and $\phi$; $\theta$, $\phi$ and $\phi$ are panning, tilting and swinging angles along x axis, y axis and z axis, respectively; and $t = [t_x, t_y, t_z]^T$ and is a translation matrix describing translation relationship between the world coordinates and the camera coordinates. Thus, through formula (7) and formula (8), a relationship between Pc(uc,vc) and PW(X,Y,Z) is obtained:

$$\left\{ \begin{array}{c} Zu_c \\ zv_c \\ z \end{array} \right\} = PM \begin{Bmatrix} x \\ y \\ z \\ 1 \end{Bmatrix} = F \begin{bmatrix} x \\ y \\ z \\ 1 \end{bmatrix}. \quad (9)$$

For a point P(X,Y,Z) in the world coordinate system, a point Pc(uc,vc) obtained by projecting the point in the world coordinate system onto the image plane can be figured out through formula (9). However, on taking images, the projected point will have biases along a radial direction and a tangent direction owing to being twisted by lens. A relationship between calibrated image coordinates $(u_0, v_0)$ and twisted image coordinates $(u_0, v_0)$ is as follows:

$$\Delta u(u_d, v_d) = (u_d - u_0)(k_1 r_d^2 + k_2 r_d^4 + k_3 r_d^6) \quad (10)$$

Therein, $\Delta u$ and $\Delta v$ are values for calibrating the twisting owing to lens and are expressed as follows:

$$\Delta u(u_d, v_d) = (u_d - u_0)(k_1 r_d^2 + k_2 r_d^4 + k_3 r_d^6)$$
$$= [2 p_1 (u_d - u_0)(v_d - v_0) + p_2(r_d^2 + 2(u_d - u_0)^2)]$$
$$(1 + p_3 r_d^2)$$

$$\Delta v(u_d, v_d) = (v_d - v_0)(k_1 r_d^2 + k_2 r_d^4 + k_3 r_d^6)$$
$$= [p_1(r_d^2 + 2(v_d - v_0)^2) + 2 p_2 (u_d - u_0)(v_d - v_0)]$$
$$(1 + p_3 r_d^2)$$

Therein, $r_d = [(u_d - u_0)^2 + (v_d - v_0)^2]^{1/2}$; $k_1$, $k_2$ and $k_3$ are twisting coefficients along the radial direction; and, $P_1$, $P_2$ and $P_3$ are twisting coefficients along the tangent direction. Thus, formula (10) can be re-expressed as:

$$\begin{bmatrix} u_d \\ v_d \end{bmatrix} = \begin{bmatrix} u_c \\ v_c \end{bmatrix} - \frac{1}{4k_1 r_c^2 + 6k_2 r_c^4 + 8p_1(v_c - v_0) +} \begin{bmatrix} \Delta u(u_d, v_d) \\ \Delta v(u_d, v_d) \end{bmatrix} \quad (11)$$
$$8p_2(u_c - u_0) + 1$$
$$= \begin{bmatrix} u_c \\ v_c \end{bmatrix} + \begin{bmatrix} \delta u \\ \delta v \end{bmatrix}.$$

Through formula (9) and formula (II), the point P(X,Y,Z) in the world coordinate system is mapped to a twisted image point $p_d(u_d, v_d)$. However, through formula (9) and formula (10), a twisted point $(u_d, v_d)$ on the image plane can be converted to a point on a projecting line of a 3D space; or an intersected point of the projecting line and a two-dimensional (2D) plane.

Figure 6:
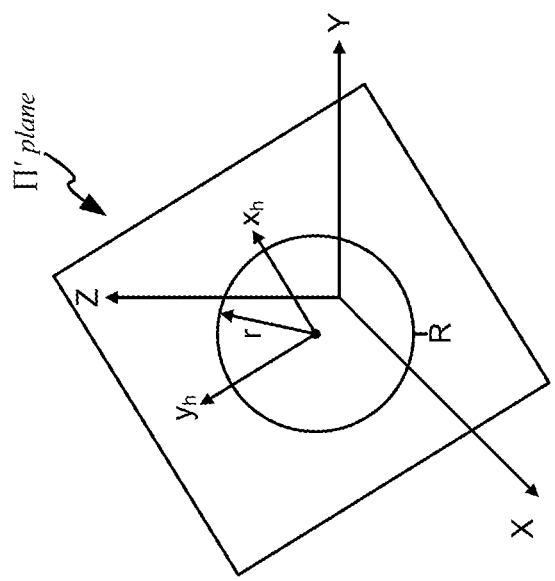
FIG. 6 is the view showing the calibrating point on the Π plane.

The center point of the calibration grids is used as a calibrating point. However, the calibrating point may not keep the original shape, but a deformed shape, after being projected onto the image plane. In FIG. 6, calibration grids R have a radius r with a calibrating point $h_0 = (X_0, Y_0, Z_0)^T$ located at an origin point of a planar coordinate system $x_h$-$y_h$. Under the world coordinate system X-Y-Z, the origin point of the planar coordinate system $x_h$-$y_h$ is $h_0 = (X_0, Y_0, Z_0)^T$; and its directional cosines on the $x_h$ coordinate axis and the $y_h$ coordinate axis are $h_1 = (X_1, Y_1, Z_1)^T$ and $h_2 = (X_2, Y_2, Z_2)^T$, respectively. Under the $x_h$-$y_h$ coordinate system, the calibrating point has a formula as follows:

$$\begin{bmatrix} x_h \\ y_h \\ 1 \end{bmatrix}^T \begin{bmatrix} -1/r^2 & 0 & 0 \\ 0 & -1/r^2 & 0 \\ 0 & 0 & 1 \end{bmatrix} \begin{bmatrix} x_h \\ y_h \\ 1 \end{bmatrix} = \begin{bmatrix} x_h \\ y_h \\ 1 \end{bmatrix}^T Q \begin{bmatrix} x_h \\ y_h \\ 1 \end{bmatrix} = 0. \quad (12)$$

Formula (12) is a conic curve formation formula. In fact, the calibrating point is projected onto the image plane and becomes a twisted calibrating point, or becomes a circular point in same certain cases. Through formula (9) and formula (12), a curve formula for projecting a circular point R on the image plane is as follows:

$$\begin{bmatrix} zu_c \\ zv_c \\ z \end{bmatrix}^T ((FH)^{-1})^T Q (FH)^{-1} = \begin{bmatrix} zu_c \\ zv_c \\ z \end{bmatrix} = 0 \quad (13)$$

where $$H = \begin{bmatrix} h_1 & h_2 & h_0 \\ 0 & 0 & 1 \end{bmatrix},$$

Under a planar coordinate system $x_h$-$y_h$, a formula for the calibrating point $(u_e, v_e)$ is as follows:

$$\lambda \begin{bmatrix} u_e \\ v_e \\ 1 \end{bmatrix} = F(HQ^{-1}H^T)F^T \begin{bmatrix} 0 \\ 0 \\ 1 \end{bmatrix} \quad (14)$$

By using formula (II), the calibrating point $(u_e, v_e)$ obtained through formula (14) is converted into twisted image point $(u_d, v_d)$:

$$\begin{bmatrix} u_d \\ v_d \end{bmatrix} = \begin{bmatrix} u_e \\ v_e \end{bmatrix} + \begin{bmatrix} \delta u \\ \delta v \end{bmatrix} \quad (15)$$

At last, a unit of projected point on the image plane for the calibration control point can be converted from mm into pixel through the following formula:

$$u = M_x u_d, \quad v = M_y v_d \quad (16).$$

Therein, $M_x$ and $M_y$, whose unit is pixel/mm, are respectively ratio coefficients on u axis and v axis for converting physical unit mm into image unit pixel.

Through the above conversion, a control dot center in the world coordinate system is obtained. For a point on the image plane, there are 15 camera parameters in the above conversions, where $M_x$, $M_y$, f, $k_1$, $k_2$, $p_1$, $p_2$ and $(u_0, v_0)$ are inner camera parameters; and $(t_x, t_y, t_z)$ and $(\theta, \phi, \varphi)$ are outer camera parameters.

By using formula (14) to formula (16), the control dot center in the world coordinate system can be mapped onto the 2D image plane for mapping a whole 3D scene onto the 2D image plane. However, the mapping is a multiple-to-one conversion. If only one camera is used, no depth related data can be obtained. Hence, in the present disclosure, a camera central optical axis is perpendicular to a calibration specimen for obtaining coordinates of all grids on a calibration plate to build the world coordinate system and a set of coordinates of calibrating points. Then, the calibrating points are used to calibrate stereo visual systems formed by the other two cameras. The two cameras each rotate an angle to take two photos of the same area and to relate points on the two photos to obtain depth data.

With M control dot centers in the world coordinate system and corresponding M points $((U_j, V_j), j=1, \ldots, M)$ on the image plane, 15 best camera parameters are obtained through nonlinear least square. Thus, through a camera model program, an error between actual image coordinates $(u_j, v_j)$ and figured-out image coordinates $(U_j, V_j)$ can be minimized through the following formula:

$$E = \sum_{j=1}^{j=M} \{(U_j - u_j)^2 + (V_j - v_j)^2\} \quad (17)$$

Figure 7:
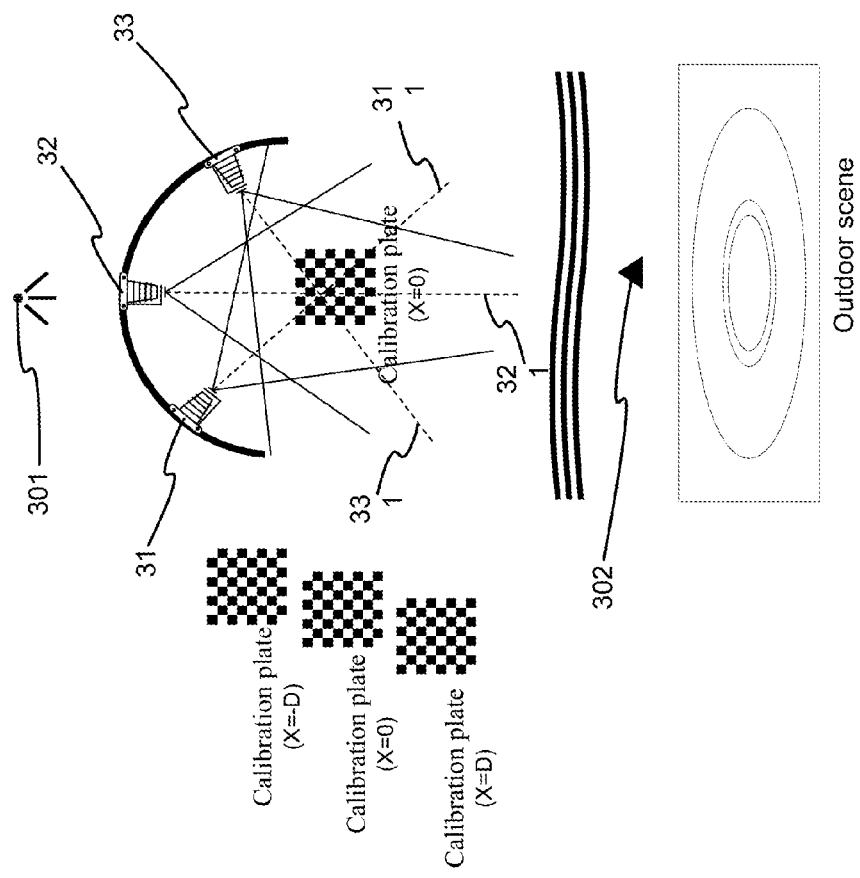
FIG. 7 is the second view showing the measurement of camera calibration parameters.

In FIG. 7, the optical axis of the first camera 31 is perpendicular to the calibration plate 4 for figuring out coordinates of the calibration grids 41 on the calibration plate 4 by the parameter mutual calibration unit 511 to build a world coordinate system and a set of calibration point coordinates; and, the calibration point coordinates are used to calibrate the stereo visual system formed by the second camera 32 and the third camera 33. The other digital image correlation formations will do the same. Then, the central optical axis of the second camera 32 is perpendicular to the calibration plate 4 for figuring out coordinates of the calibration grids 41 on the calibration plate 4 by the parameter mutual calibration unit 511 to build a world coordinate system and a set of calibration point coordinates; and, the calibration point coordinates are used to calibrate the stereo visual system formed by the first camera 31 and the third camera 33. Then, the central optical axis of the third camera 33 is perpendicular to the calibration plate 4 for figuring out coordinates of the calibration grids 41 on the calibration plate 4 by the parameter mutual calibration unit 511 to build a world coordinate system and a set of calibration point coordinates; and, the calibration point coordinates are used to calibrate the stereo visual system formed by the first camera 31 and the second camera 32.

The center point of the calibration grids 41 is used as a calibrating point and is projected onto the image plane to build the world coordinate system and the M calibrating points in the world coordinate system. By using the M calibrating points and the camera model program, the stereo visual system is calibrated to figure out the inner camera parameters of $M_x$, $M_y$, f, $k_1$, $k_2$, $p_1$, $p_2$ and $(u_0, v_0)$ and the outer camera parameters of $(t_x, t_y, t_z)$ and $(\theta, \phi, \varphi)$ for each camera. A relationship formula between the center of the calibration grids 41 and the center of the image plane is used to reduce errors and radial and circumferential lens distortion coefficients of the first, the second and the third cameras 31,32,33 for improving accuracies of the first, the second and the third cameras 31,32,33.

The following steps are processed for calibration of 3D visual system and evaluation of measurement error (where the calibration plate 4 and the central optical axis of the first camera 31 are perpendicular to the calibration specimen; and, the formation digital images for the second camera 32 and the third camera 33 will be processed in the same way):

(1) The first camera 31 is adjusted to make its optical axis perpendicular to the calibration grids 41 of the calibration plate 4 and make the N×N grid array located within a visual area.

(2) Error values of the first camera 31 on vertical and horizontal directions and parameters of calibrating points for the first camera 31 are obtained through forward and backward movement at X=D and X=−D. With the scale factor of the vertical and horizontal directions of the image photographed by the first camera 31, a world coordinate system and coordinates of N×N grids under the world coordinate system are obtained.

(3) The second and the third cameras 32,33 are adjusted to obtain images of the same observing area as that of the first camera 31. The 3D reconstruction done by the second and the third cameras 32,33 is calibrated with coordination of the 3D reconstruction unit 514.

(4) With the calibrated 3D reconstruction, rigid body displacement is measured to evaluate basic measurement error.

Figure 8:
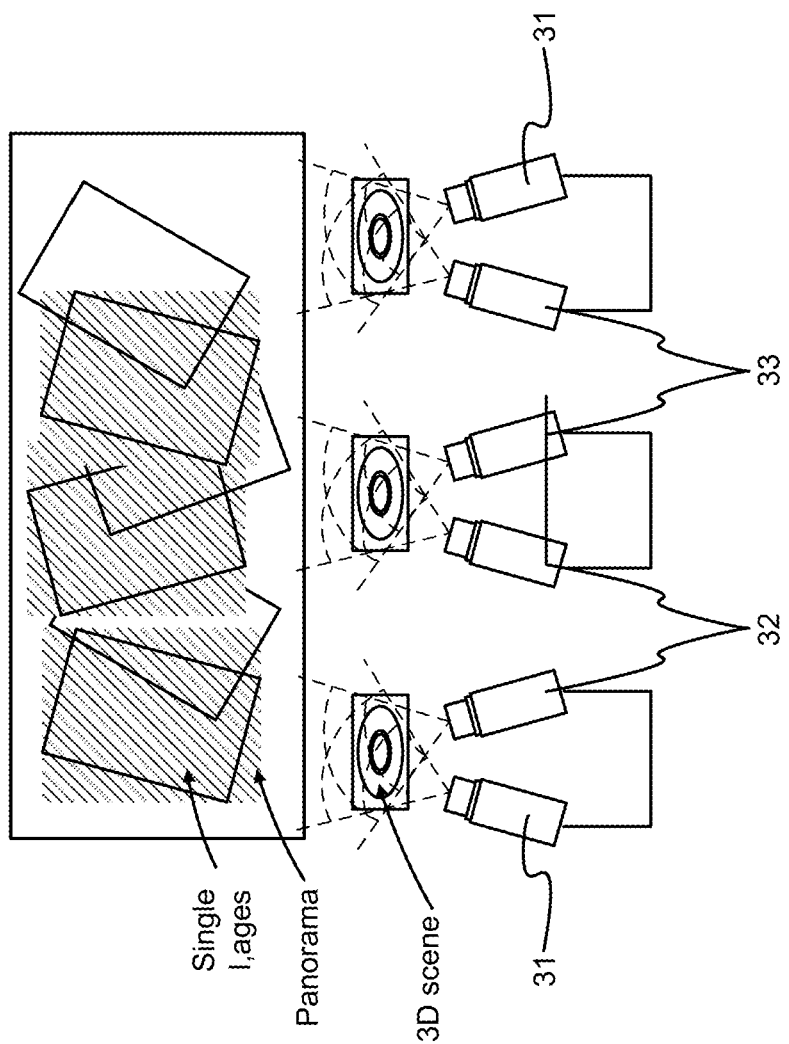
FIG. 8 is the view showing the panorama stitching.
Figure 9:
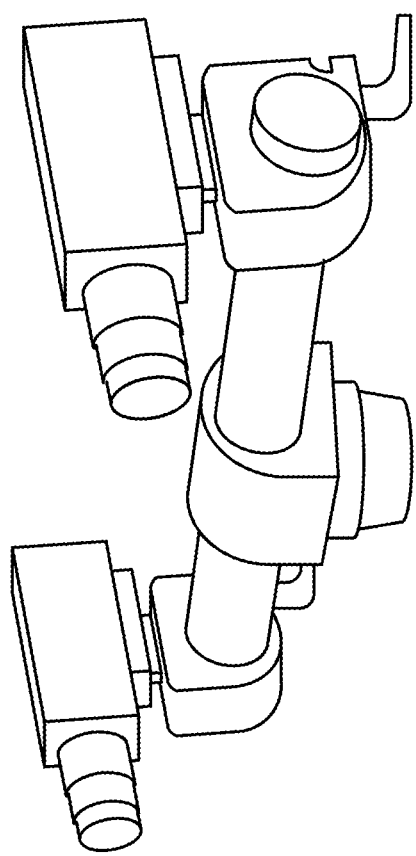
FIG. 9 is the view showing the prior art.

Panorama stitching is processed by the panorama stitching unit 512 to obtain a scene of a large-scale area through the following two steps (as shown in FIG. 8):

(1) Each of at least the first, the second and the third cameras 31,32,33 simultaneously photograph a left image (image taken from left side) and a right image (image taken from left side) of a scene for figuring out parameters of at least the first, the second and the third cameras 31,32,33 after calibration.

(2) According to the parameters, the left and the right images are projected to the scene through image matching.

Or, a series of images can be inputted to obtain a panorama through image stitching. The series of images is obtained by photographing at any angles with an optical center; and every two neighboring images are overlapped at a certain degree. At first, twisted or projected images are inputted into a specific mathematical model. Then, the first image, the second image and so forth until the last image are used to figure out a gradient of image parameters. Accordingly, image stitching parameters are figured out by parameters of the gradient and the inputted images. At last, best points are decided for stitching neighboring images to form a panorama with depth information in a 3D style.

Furthermore, the panoramic digital image correlation formation unit 513 stitches digital images through the following two steps:

(1) The left and the right images photographed by the first, the second and the third cameras 31,32,33 are used for figuring out camera parameters after calibration.

(2) According to the parameters, the left and the right images are projected to a scene through image matching.

Or, a series of images can be inputted to obtain a panorama through image stitching. The series of images is obtained by photographing at any angles with an optical center; and every two neighboring images are overlapped at a certain degree. At first, twisted or projected images are inputted into a specific mathematical model. Then, the first image to the second image and so forth until the last image are used to figure out a gradient of image parameters. According to the parameters, image stitching parameters are figured out to find a possible solution.

The following steps are processed for stitching digital images:

(1) Camera sets of N1-N2, N2-N3 and N3-N1 are adjusted for panorama stitching to obtain local panoramas formed by the cameras N1-N2, N2-N3 and N3-N1.

(2) Combining the local panoramas formed by the camera sets of N1-N2, N2-N3 and N3-N1 to form a whole field 3D reconstruction scene.

(3) The 3D reconstruction scene is used to measure rigid body displacements through panorama images obtained after 3D reconstruction for evaluating a basic measurement error.

At last, best points are decided for stitching two neighboring images to form a panorama with depth information in a 3D style. Through the above regular formation, strain values for a large-scale 3D area can be obtained for monitoring relative displacements between objects. By using the first, the second and the third cameras 31,32,33, advantages on whole field, far distance and convenience are obtained for quick displacement measurement to analyze strain in displacement field and figure out strain reaction of a structure under effect of outside force. Hence, the present disclosure has the following advantages:

1. Required equipments and processes are simple, workable and accurate. Balancing units are also used to ensure stability on measuring.

2. Measuring area is scalable even to a large-scale area.

3. By comparing inner and outer parameters of at least three cameras, displacement and strain parameters can be accurately figured out.

4. An automatic calculating program thus built can rapidly analyze digital image data obtained before and after affected by outer force for figuring out values of displacement and strain.

5. Image records of an object deformed by outer force monitored by the cameras can be permanently stored for later study.

The present disclosure uses at least three cameras to measure deformation through digital image correlation formation in a non-contact measurement. Thus, the present disclosure is advantaged in whole field, far distance and convenience for rapid displacement measurement. The cameras measure displacement field for strain analysis to figure out structural strain reaction under outside force. Through a concyclic way, the present disclosure uses the cameras to increase interlaced areas and to compare calibrating parameters. The cameras are located on a measuring track which has a hollow arc shape with central optical axes of the cameras crossed at a center point; and the cameras use adjusting units to adjust intervals in between. On measuring and reconstructing 3D information, calibrating parameters are already built inside the system. On monitoring objects having different sizes, only the adjusting units on the measuring track are necessary to be moved for adjusting intervals for photographing. Thus, 3D information are rapidly rebuilt and structural deformation is fast, conveniently and effectively measured.

To sum up, the present disclosure is a formation apparatus using digital image correlation, where even a large-scale area is monitored with at least three cameras for measuring displacement and strain in advantages of whole field, far distance and convenience.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A formation apparatus using digital image correlation, comprising
    a bearing unit, said bearing unit comprising
        a base; and
        a measuring track, said measuring track being bonded with said base;
    a plurality of adjusting units, said adjusting units comprising at least a first adjusting unit, a second adjusting unit and a third adjusting unit, said adjusting units being movably set on said measuring track;
    an image taking unit, said image taking unit comprising at least
        a first camera, said first camera being set on said first adjusting unit;
        a second camera, said second camera being set on said second adjusting unit; and
        a third camera, said third camera being set on said third adjusting unit,
        wherein at least said first camera, said second camera and said third camera use at least a first calibrating point and a second calibrating point as reference points to process measurement;
    a calibration plate, said calibration plate being set on a plane of optical axes of said first camera, said second camera and said third camera; and
    a processing unit, said processing unit being connected with at least said first camera, said second camera and said third camera,
        wherein said processing unit has a digital image formation computing module to analyze digital image data obtained from at least said first camera, said second camera and said third camera.

2. The apparatus according to claim 1,
    wherein said measuring track has a hollow arc shape;
    wherein said optical axes of at least said first camera, said second camera and said third camera are concyclic at a cyclic point; and
    wherein at least said first camera, said second camera and said third camera on said measuring track use said adjusting units to adjust intervals in between.

3. The apparatus according to claim 1,
    wherein each of said adjusting units comprises
        a slider, said slider movably bonded with said measuring track;
        an adjusting seat, said adjusting seat being set on said slider;
        a balancing unit, said balancing unit being set on said slider; and
        an electric controller, said electric controller being set on said slider; and
    wherein said first camera, said second camera and said third camera are separately set on said adjusting seats of said adjusting units.

4. The apparatus according to claim 3,
    wherein said slider has a pulley and a tensioner at two ends of said slider to be butted against said measuring track; and
    wherein said tensioner is connected with an adjusting knob.

5. The apparatus according to claim 1,
    wherein said first calibrating point is set on said base to fix at least said first camera, said second camera and said third camera with said central optical axes of said first camera, said second camera and said third camera crossing at said cyclic point, said cyclic point being used as an initial point to process measurement;
    wherein said second calibrating point is a reference point in an outdoor scene; and
    wherein said second calibrating point; a center point of said second camera; and said first calibrating point are located on a central optical axis line.

6. The apparatus according to claim 5,
    wherein said labeling rod has a labeling scale to process calibration.

7. The apparatus according to claim 1,
    wherein said second calibrating point is coordinated with a labeling rod positioned at a distant object to process repeating measurements through at least said first camera, said second camera and said third camera.

8. The apparatus according to claim 1,
    wherein said calibration plate has a calibration grid center used as a calibrating point of at least said first camera, said second camera and said third camera to process calibration; and
    wherein said calibration grids have a fixed interval between every two grids.

9. The apparatus according to claim 8,
    wherein each of said calibration grids on said calibration plate has a shape selected from a group consisting of a circular shape and a square shape.

10. The apparatus according to claim 8,
    wherein an image obtained through at least said first camera, said second camera and said third camera has twisted calibration grids with a plane of said calibration grids of said calibration plate not parallel to an image plane of said optical axes of at least said first camera, said second camera and said third camera.

11. The apparatus according to claim 1,
    wherein said processing unit further comprises an alarm unit.

12. The apparatus according to claim 1,
    wherein said digital image formation computing module comprises a parameter mutual calibration unit, a panorama stitching unit, a panoramic digital image correlation formation unit and a three-dimensional (3D) reconstruction unit;
    wherein said digital image formation computing module processes calibration to said first camera, said second camera and said third camera with a coordination of said calibration plate; and
    wherein said digital image formation computing module analyzes image data obtained through said first camera, said second camera and said third camera to obtains values of displacement and strain.

13. The apparatus according to claim 12,
    wherein said parameter mutual calibration unit adjusts a central optical axis of said first camera to be perpendicular to a visual area of said calibration plate.

14. The apparatus according to claim 12,
    wherein said parameter mutual calibration unit obtains vertical and horizontal error values of said first camera and obtains vertical and horizontal scale factor by moving said first camera to obtain a world coordinate system.

15. The apparatus according to claim 12,
    wherein said parameter mutual calibration unit adjusts said second camera and said third camera to obtain the same size of observing area as that of said first camera and to thus calibrate 3D reconstruction obtained through said second camera and said third camera.

16. The apparatus according to claim 12,
wherein said parameter mutual calibration unit adjusts a central optical axis of said second camera to be perpendicular to a visual area of said calibration plate.

17. The apparatus according to claim 12,
wherein said parameter mutual calibration unit obtains vertical and horizontal error values of said second camera and obtains vertical and horizontal scale factor by moving said second camera to obtain world coordinate system.

18. The apparatus according to claim 12,
wherein said parameter mutual calibration unit adjusts said first camera and said third camera to obtain the same size of observing area as that of said second camera and to thus calibrate 3D reconstruction obtained through said first camera and said third camera.

19. The apparatus according to claim 12,
wherein said parameter mutual calibration unit adjusts a central optical axis of said third camera to be perpendicular to a visual area of said calibration plate.

20. The apparatus according to claim 12,
wherein said parameter mutual calibration unit obtains vertical and horizontal error values of said third camera and obtains vertical and horizontal scale factor (mm/pixel) by moving said third camera to obtain a world coordinate system.

21. The apparatus according to claim 12,
wherein said parameter mutual calibration unit adjusts said first camera and said second camera to obtain the same size of observing area as that of said third camera and to thus calibrate 3D reconstruction obtained through said first camera and said second camera.

22. The apparatus according to claim 12,
wherein said panorama stitching unit obtains a scene of a large-scale area through steps of:
  (a) obtaining an image of said scene from left side (left image) and an image of said scene from right side (right image) by each of at least said first camera, said second camera and said third camera for figuring out parameters of at least said first camera, said second camera and said third camera after calibration; and
  (c) projecting said left and said right images to said scene through image matching.

23. The apparatus according to claim 22,
wherein said scene is photographed through the same optical center to obtain said left and said right images;
wherein said left and said right images are obtained at any predestined angles; and
wherein every neighboring two of said left and said right images are overlapped at a certain degree.

24. The apparatus according to claim 22,
wherein said scene is obtained through steps of:
  (a) inputting images to a specific mathematic model, wherein said images are selected from a group consisting of twisted imaged or projected images;
  (b) obtaining a gradient from a first image, a second image and so forth until the last image of said inputted image; and
  (c) obtaining image stitching parameters by parameters of said gradient and said inputted images to decide best points to stitch neighboring images to form a panorama with depth information.

25. The apparatus according to claim 12,
wherein said panoramic digital image correlation formation unit separately adjusts a set of said first and said second cameras, a set of said second and said third cameras and a set of said third and said first cameras to process panorama stitching to obtain local panoramas of said first, said second and said third cameras.

26. The apparatus according to claim 12,
wherein said panoramic digital image correlation formation unit combines local panoramas obtained by said first and said second cameras; said second and said third cameras; and said third and said first cameras to obtain a whole field 3D reconstruction scene.

27. The apparatus according to claim 12,
wherein said panoramic digital image correlation formation unit obtains rigid body displacements through panorama images obtained after 3D reconstruction to evaluate a basic measurement error.

28. The apparatus according to claim 12,
wherein said 3D reconstruction unit shows an image with depth information in a 3D style.

\* \* \* \* \*